(12) United States Patent
Gutknecht et al.

(10) Patent No.: US 12,416,371 B2
(45) Date of Patent: Sep. 16, 2025

(54) VALVE MODULE STROKE DETECTION

(71) Applicant: Illinois Tool Works Inc., Glenview, IL (US)

(72) Inventors: Kevin R. Gutknecht, Hendersonville, TN (US); Edward W. Bolyard, Jr., Old Hickory, TN (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 16/764,203

(22) PCT Filed: Oct. 29, 2018

(86) PCT No.: PCT/US2018/057956
§ 371 (c)(1),
(2) Date: May 14, 2020

(87) PCT Pub. No.: WO2019/103811
PCT Pub. Date: May 31, 2019

(65) Prior Publication Data
US 2020/0386344 A1    Dec. 10, 2020

Related U.S. Application Data

(60) Provisional application No. 62/589,688, filed on Nov. 22, 2017.

(51) Int. Cl.
*F16K 37/00* (2006.01)
*B05C 11/10* (2006.01)
*G01M 13/003* (2019.01)

(52) U.S. Cl.
CPC ...... *F16K 37/0033* (2013.01); *B05C 11/1026* (2013.01); *G01M 13/003* (2019.01)

(58) Field of Classification Search
CPC .............. F16K 37/0033; G01M 13/003; B05C 11/1026
See application file for complete search history.

(56) References Cited

U.S. PATENT DOCUMENTS

| 3,708,047 A | 1/1973 | Kuhnle et al. |
|---|---|---|
| 4,899,127 A | 2/1990 | Kawai et al. |

(Continued)

FOREIGN PATENT DOCUMENTS

| CN | 102014983 A | 4/2011 |
|---|---|---|
| CN | 102032384 A | 4/2011 |

(Continued)

OTHER PUBLICATIONS

International Search Report issued by ISA/EPO in connection with PCT/US2018/057956 on Apr. 8, 2019.

(Continued)

*Primary Examiner* — Angelisa L. Hicks
(74) *Attorney, Agent, or Firm* — Levenfeld Pearlstein, LLC (57) ABSTRACT

A valve module stroke detection system includes an adhesive valve module having a reciprocating valve pin. The pin reciprocates in a first direction by application of a compressed gas on one side of a piston and reciprocates in a second opposite direction. The reciprocating pin has a portion in an adhesive flowpath. A sensed element is positioned on the valve pin outside of the adhesive flow path. A sensor is positioned outside of the adhesive flow path. The sensor cooperates with the sensed element and generates a movement signal upon sensing a movement of the valve pin and generates a timing signal upon of the movement of the valve pin. A processor processes the movement signal and the timing signal and a recording medium records the movement signal and the timing signal.

5 Claims, 7 Drawing Sheets

(56) References Cited

U.S. PATENT DOCUMENTS

| | | | |
|---|---|---|---|
| 5,329,465 | A | 7/1994 | Arcella et al. |
| 5,862,986 | A * | 1/1999 | Bolyard, Jr. .......... B05C 5/0279 239/135 |
| 6,670,806 | B2 | 12/2003 | Wendt et al. |
| 6,983,860 | B2 * | 1/2006 | Arnaboldi ................. B05C 5/02 222/146.2 |
| 7,996,096 | B2 * | 8/2011 | Latwesen ............ F16K 37/0091 700/110 |
| 9,057,628 | B2 * | 6/2015 | Drespling ............. G01D 5/145 |
| 9,144,929 | B2 | 9/2015 | Tan et al. |
| 2003/0194481 | A1 | 10/2003 | Lippelt |
| 2007/0069041 | A1 * | 3/2007 | Quinones ............. H05K 13/046 239/71 |
| 2008/0094806 | A1 * | 4/2008 | Grethel ................. F15B 21/085 361/728 |
| 2012/0118136 | A1 | 5/2012 | Heerdt |
| 2014/0117050 | A1 | 5/2014 | Beal et al. |
| 2015/0190837 | A1 | 7/2015 | Burmester et al. |
| 2016/0146374 | A1 * | 5/2016 | Graichen ............. F02B 37/183 137/554 |
| 2016/0222995 | A1 * | 8/2016 | Zientara .................. F04B 17/06 |
| 2019/0111603 | A1 * | 4/2019 | de Oliveira Antunes ................... G09G 5/008 |

FOREIGN PATENT DOCUMENTS

| | | |
|---|---|---|
| CN | 105457777 A | 4/2016 |
| DE | 10108732 A1 | 9/2002 |
| WO | 2011084727 A2 | 7/2011 |
| WO | 2014025369 A2 | 2/2014 |

OTHER PUBLICATIONS

Written Opinion issued by ISA/EPO in connection with PCT/US2018/057956 on Apr. 8, 2019.

International Preliminary Report on Patentability issued by ISA/EPO in connection with PCT/US2018/057956 on Jun. 4, 2020.

Office Action issued by EPO in connection with EP Patent Application No. 18807769.7 on Oct. 20, 2021.

Hu, Ruiwen, "First Edition of Intelligent Detection and Control System," Xi'an Jiaotong University Press, Jun. 30, 1991, pp. 58-59.

"Safety Detecting Technology", pp. 102-104, Nailu Zhang, Xi'an Electronic Technology University Press, Sep. 30, 2007.

* cited by examiner

VALVE MODULE STROKE DETECTION

BACKGROUND

Adhesive hot melt systems in a wide variety of industries and applications to apply an adhesive, such as a hot melt adhesive, to a substrate, such as a moving substrate. A system can include an applicator for applying a hot melt adhesive onto a substrate. Conventional applicators include an applicator head having a service block, a manifold and a module and a nozzle. An adhesive valve is disposed in the module. A typical adhesive valve is a controlled by control air supplied through one or more solenoid valves.

Such systems are used in manufacturing lines that require precise, metered application of adhesive in high production volume scenarios. In some high production lines, the valves may cycle between an open and a closed position 10,000 times per minute at adhesive temperatures as high as 425° F. As such, the valves are subject challenging operating conditions while required maintain strict adhesive application specifications.

Due to the nature of the valves, the operating conditions and the adhesive conveyed through the valves, the valves can be subject to wear and can operate at less than defined specifications. That is, valves may not travel fully between the open and closed positions (less than full stroke), or they may operate at speeds less than that required to maintain the desired manufacturing line speeds.

As such, it is desirable to have the ability to monitor the valve's performance to assure that it is operating at its designed performance levels. One way in which to monitor the valve is disclosed in Quinones, et al., US Publication 2007/0069041, which discloses sensing certain operating conditions of the dispensing system, including the displacement of the actuator valve shaft, sensing the pressure of the actuating air in the air cylinder, and sensing the vibration of dispenser during operating.

However, these monitoring schemes are complex and require that significant additional components are incorporated into the dispensing system. Moreover, the known systems lack certain monitoring capabilities, for example, these known systems lack indication of the status (open/closed) for the valve and they lack the ability to collect, analyze and present raw sensor data to a user or operating personnel. In addition, these known systems lack troubleshooting capabilities, such as solenoid functioning and air pressure indication, and they do not provide a basis for establishing preventative maintenance capabilities, such as data trending over time, predictive lifetime and the like.

Accordingly, it is desirable to provide a system to detect and monitor valve module stroke in hot melt dispenser systems. Desirably, such a system uses minimal additional components and provides enhanced monitoring capabilities. More desirably still, such a system provides indication of the status of the valve module (the dispensing valve). Still more desirably, such a system includes the ability to collect, analyze and present raw sensor data to a user or operating personnel, and can also provide troubleshooting capabilities, as well as provide a basis for establishing preventative maintenance capabilities.

SUMMARY

According to one aspect, a valve module stroke detection system, includes an adhesive valve module having a reciprocating valve pin, that reciprocates in a first direction by application of a compressed gas, such as compressed air, on one side of a piston and reciprocates in a second opposite direction. The pin can reciprocate in the second, opposite direction by application of a compressed gas such as air. The reciprocating pin has a portion in an adhesive flowpath. A sensed element is disposed on the valve pin outside of the adhesive flow path.

As described in detail herein, Accordingly, a valve module stroke detection system detects and monitors valve module stroke in hot melt dispenser systems. A system uses minimal additional components and provides enhanced monitoring capabilities. Such a system can provide indication of the status of the valve module (the dispensing valve), and in embodiments, such a system includes the ability to collect, analyze and present raw sensor data to a user or operating personnel, and can also provide troubleshooting capabilities, as well as provide a basis for establishing preventative maintenance capabilities.

In embodiments, a sensor is positioned outside of the adhesive flow path. The sensor is configured to cooperate with the sensed element and generate a movement signal upon sensing a movement of the valve pin and to generate a timing signal upon of the movement of the valve pin. The timing signal corresponds to the time to move the valve pin.

A processor processes the movement signal and the timing signal and a recording medium records the movement signal and the timing signal. In an embodiment, the processor is configured to determine baseline conditions for the valve module. In an embodiment, the sensed element is a magnet and the sensor is a Hall effect type sensor.

The processor can be configured to compare the movement signal and the timing signal to the baseline conditions for the valve module to establish a comparative movement value and a comparative timing value. The comparative movement value and the comparative timing value can be stored in a medium. The data can be stored locally, at the processor or in storage local to the processor and/or remotely including on portable media, such as a portable storage drive. In an embodiment, the includes an indicator to indicate the state of the valve being open or closed. The indicator can be is local to or remote from the adhesive valve module.

In an embodiment, the system includes a plurality of adhesive modules, each adhesive module having a respective sensed element on its respective valve pin and a respective sensor. Each sensor is configured to cooperate with its sensed element, and comparative movement values and comparative timing values are generated and stored for each of the plurality of adhesive modules. The movement and timing signals and the comparative movement and timing values can be determined for each valve module sequentially and can be used to develop trend data. The trend data can also be stored in a medium locally, at the processor or in storage local to the processor and/or remotely including on portable media, such as a portable storage drive.

In an aspect, a method for monitoring the performance of a valve module in an adhesive dispenser system having one or more modules, includes the steps of measuring a baseline data for each of the one or more valve modules, upon receipt of a trigger signal high, recording a time to open the valve module and a position of the valve module, storing the recorded time to open data and the position data, if the trigger signal high is maintained and a recording window limit is not reached, continuing recording data, and if the trigger signal high is not received or if the recording window limit has been reached, awaiting receipt of a trigger signal low.

The method further includes upon receipt of a trigger signal low, recording, a time to close the valve module the position of the valve module, and storing the recorded time to close data and the position data if the trigger signal low is maintained and a recording window limit has not been reached, continuing recording data.

Further, the method includes, if the trigger signal low is not received or if the recording window limit has been reached, analyzing the data and logging and storing the data and awaiting a second trigger signal high. The method can include monitoring the performance of at least two valve modules. A method can include the step of establishing a queue, such that the step of awaiting a second trigger high signal is awaiting a trigger high signal from a second valve module in the queue. The method can also include the step of resetting the queue following monitoring the performance of all of the valve modules in the queue.

Other objects, features, and advantages of the disclosure will be apparent from the following description, taken in conjunction with the accompanying sheets of drawings, wherein like numerals refer to like parts, elements, components, steps, and processes.

DETAILED DESCRIPTION

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Figure 1:
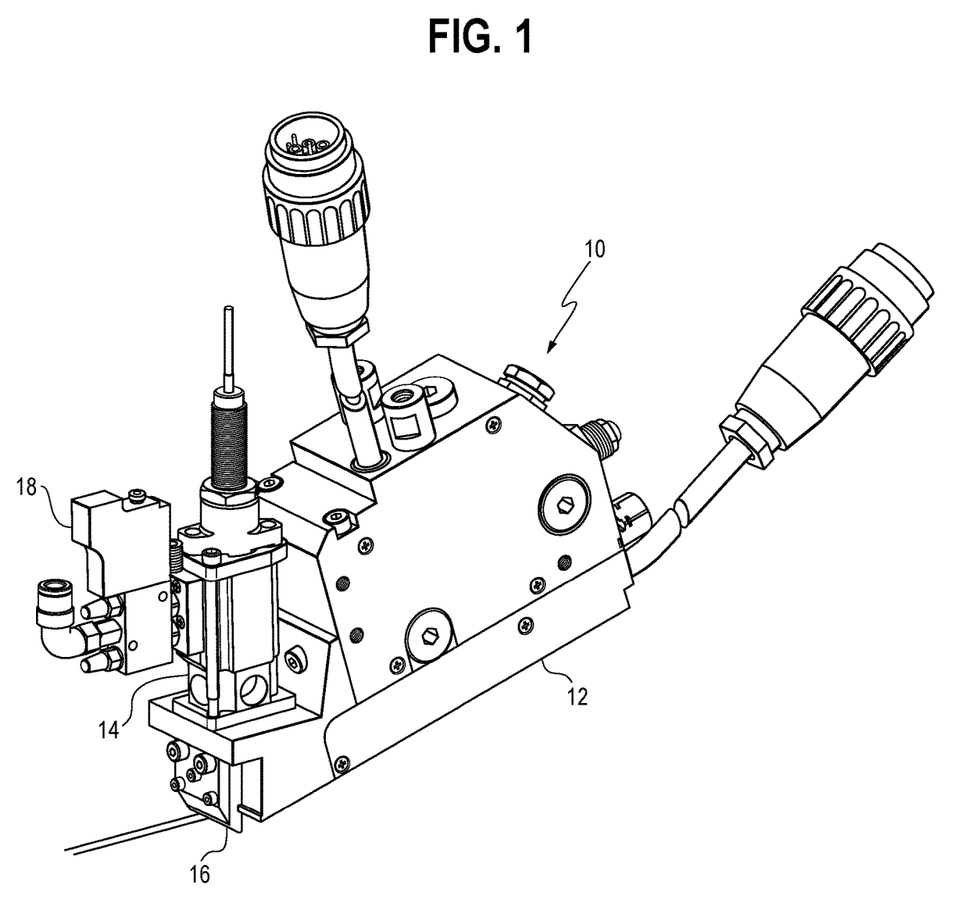
FIG. 1 is a rendering of an adhesive applicator having a valve module stroke detector or sensor in accordance with an embodiment.

FIG. 1 is an example of a portion of an adhesive applicator or dispensing system 10 showing generally an applicator head 12, a valve module 14 and a nozzle 16. A solenoid actuator 18 is mounted to the valve module 14 to supply control air to the valve module 14 to move the a valve pin 20 between the open and closed states. A sensor assembly 22 is mounted to the valve module 14 to sense or monitor the position of the valve pin 20 as will be described in more detail herein.

Adhesive is fed, under pressure, to the valve module 14 though the applicator head 12 and is discharged from the applicator head 12 through the nozzle 16, as is well known in the art. The adhesive may be discharged alone, or it may be discharged with air, depending upon the type of applicator and the type of application, again, which will be recognized by those skilled in the art.

Figure 2:
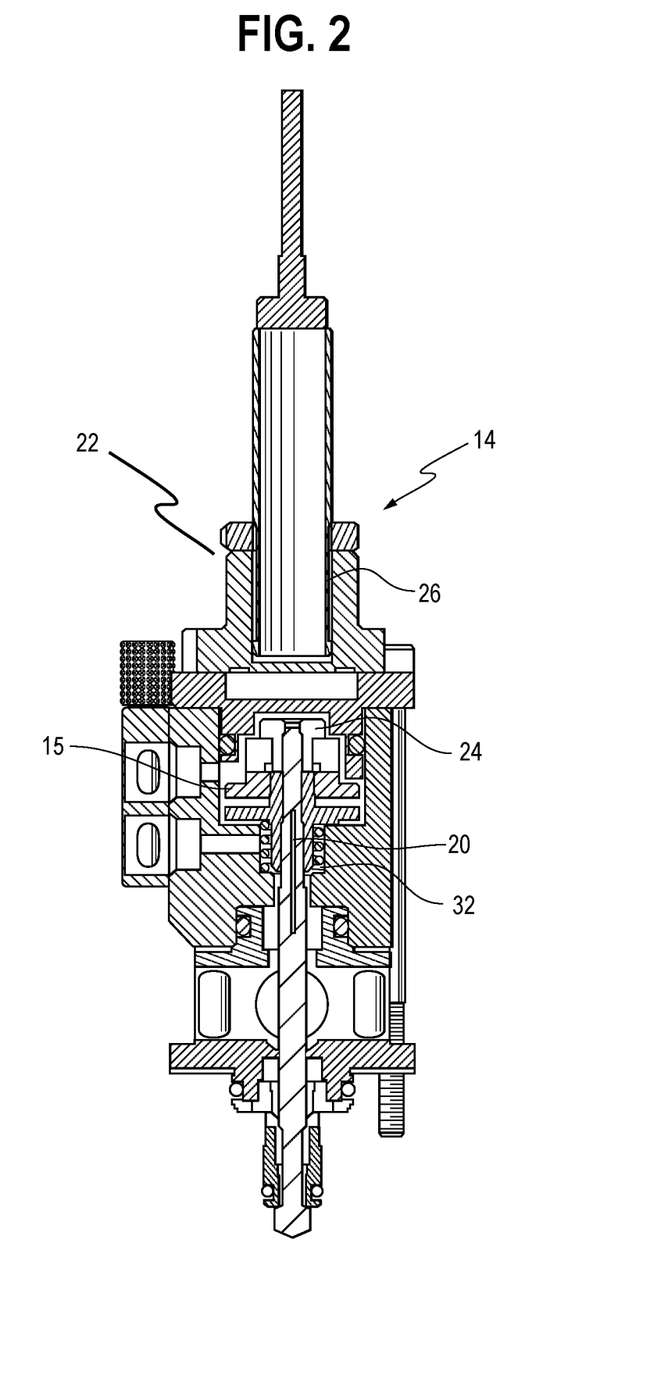
FIG. 2 is rendering, in cross-section, of the valve module and detector/sensor of FIG. 1.

The valve module 14 is opened and closed by movement of the valve pin 20 in the module 14. The pin 20 is moved between the open and closed positions by control air supplied by the solenoid valve or actuator 18 mounted to the valve module 14. The illustrated valve module 14 is an air to open and air to close valve. That is, the valve module 14 is opened and closed by application of a compressed gas, such as control air on opposite sides of a piston or diaphragm 15. The valve module 14 can be configured with a spring 32 to close the valve module 14 in the event of a loss of control air. The control air is required to move the valve module 14 and the valve pin 20 between the open and closed states.

The sensor assembly 22 is positioned on the valve module 14 to detect the displacement of the pin 20. One suitable sensor assembly 22 is a magnetic sensor. Such a sensor assembly can be of the type described in Heerdt, US Publication 2012/0118136, titled, Motor Control, commonly assigned with the present application, the disclosure of which is incorporated herein in its entirety. Although the Heerdt disclosure is directed to motor piston sensing and control by sensing the position of a reciprocating piston in a motor housing using a magnetic sensor to generate a continuous output signal corresponding to a position of the magnet relative to the sensor, such a sensor and system can be used for determining the position of a reciprocating portion of a valve, such as the valve pin or stem as it moves though a valve body.

In such an application, a magnet 24 is mounted to, for example, the valve pin 20 for movement with the pin 20 as the pin 20 reciprocates between the open and closed positions. A sensor 26, such as a Hall effect sensor is fixedly mounted to the valve module 14. The magnet 24 and sensor 26 can be positioned outside of the adhesive flow path, and both or either can be positioned inside or outside of the control air flow path. The sensor 26 generates a continuous, analog signal corresponding to the position of the magnet 25 disposed on the reciprocating valve pin 20. The magnet 24 can take many shapes, such as ring-shaped, disk-shaped, or any other appropriate shape and is disposed on the reciprocating pin 20 element in any known manner, such as by adhesive, screws, clamps, interference fit and the like. One advantage of a Hall effect sensor is that it is not influenced by anything other magnetic fields.

The sensor 26 can be coupled to any of various locations on the valve module 14 housing, and is preferably disposed axially in relation to the movement of the magnet 24 on the reciprocating pin 20. The sensor 26 can be coupled to a processor 28, such as a signal processor to process signals from the sensor 26 to track continuously the position of the magnet 24 and thus the reciprocating valve pin 20 within the module 14. When placed at an axial end of the valve pin 20 stroke, and preferably at an axial end of the module 14, the sensor 26 facilitates the continuous tracking of the magnet 24 and thus the reciprocating valve pin 20 in a linear relationship to the output of the sensor (typically in volts).

In embodiments, the system can include a heat break module cap configuration to limit heat transfer to the sensor. Embodiments in which multiple modules and/or sensors are used, as discussed below, can also include magnetic field shielding material between adjacent modules and/or sensors to reduce cross-talk or outside influences to the sensors.

In an embodiment, the sensor system is used to determine baseline or ideal operating conditions for a valve module. In such a system, the system first detects the full open and full closed positions of the valve module, assigns labels to the positions and calculates the displacement of the valve module based on the assigned labels. The system then calculates and assigns open and closed thresholds for real time open and closed indication, and measures the actual actuation times, both pre-displacement and displacement for movement from the closed position to the open position, and the de-actuation, again both pre-displacement and displacement for movement from the open position to the closed position. The system then measures the signature of the solenoid magnetic field.

During operation, the system monitors, calculates and stores actual operating data, including valve module at full open and full closed positions, calculates the displacement of the valve module based on the assigned labels, measures the actuation times, pre-displacement and displacement for movement from the closed position to the open position, measures de-actuation, pre-displacement and displacement for movement from the open position to the closed position, and measures the signature of the solenoid magnetic field. The measured data is logged and stored. The data can be stored locally, at the processor or in storage local to the processor and/or remotely including on portable media, such as a portable storage drive. The system can provide valve module status, such a valve open and closed positions, which status can be indicated locally or remotely.

Figure 3:
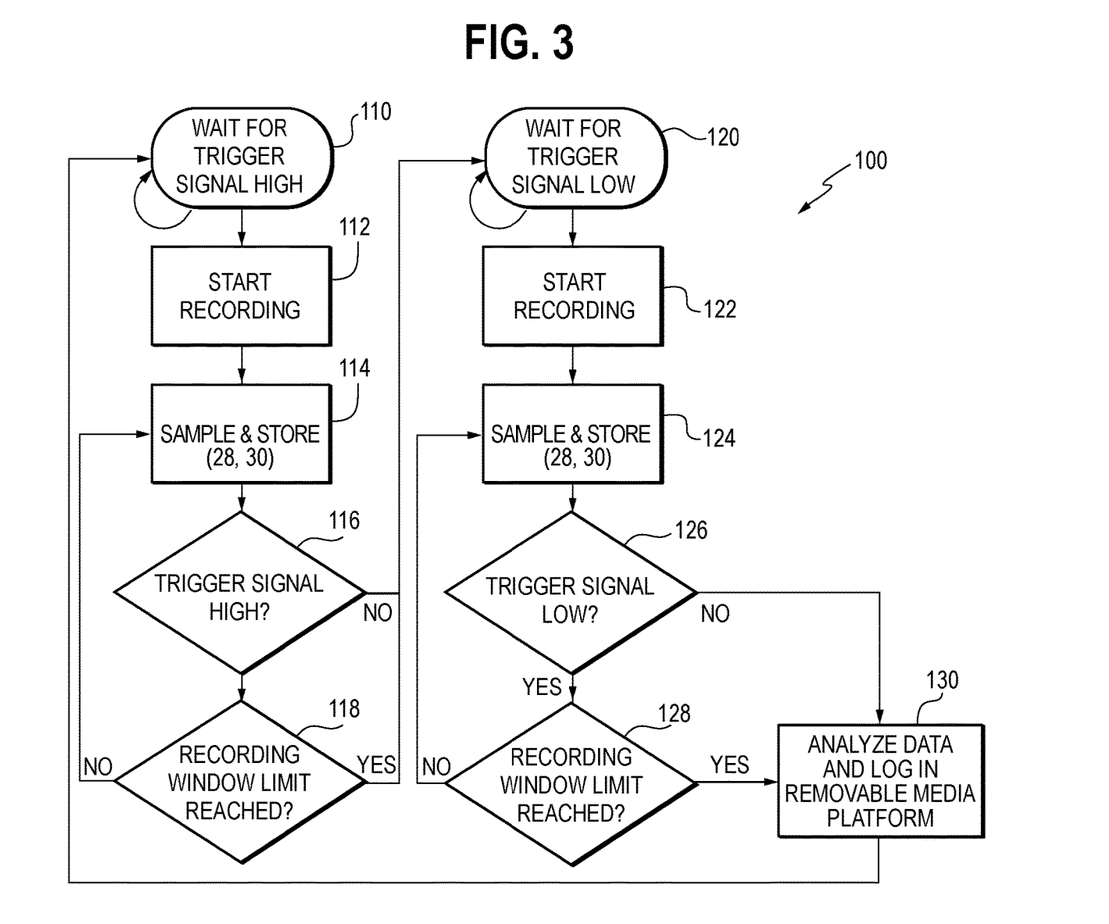
FIG. 3 is a process flow diagram for an embodiment of a monitoring and process scheme for a single channel.

In one embodiment of a monitoring and process scheme 100 is illustrated in FIG. 3, for a single channel, that is, for a monitoring a single valve module, the system waits for a trigger signal high, which is a signal to open the valve module. Upon receipt of the signal, at step 110, the recording of data commences at step 112, as noted above, recording the time to open and the position of the valve member. The data is sampled and stored at step 114. If a trigger signal high is maintained as at step 116, and a recording window limit, at step 118 is not reached, data sampling and storing continues, returning to step 114.

If a trigger signal high, at step 116 is not received, indicating that the signal to open has ceased (signaling closure of the valve module), or if the recording window limit has been reached as at step 118, the system awaits receipt of the trigger signal low, at step 120. The recording of data commences at step 122, as noted above, recording the time to close and the position of the valve member, and the data is sampled and stored at step 124. If a trigger signal low is maintained at step 126, and a recording window limit has not been reached, at step 126, data sampling and storing continues, returning to step 124. Returning to step 126, if a trigger signal low is not received, indicating that the signal to close has ceased (signaling opening of the valve module), or if the recording window limit has been reached as at step 126, the analyzes the data and logs and stores the data, as indicated above, locally, at the processor or in storage local to the processor and/or remotely including on portable media, such as a portable storage drive. The system then returns to await a trigger signal high as at step 110.

Figure 4:
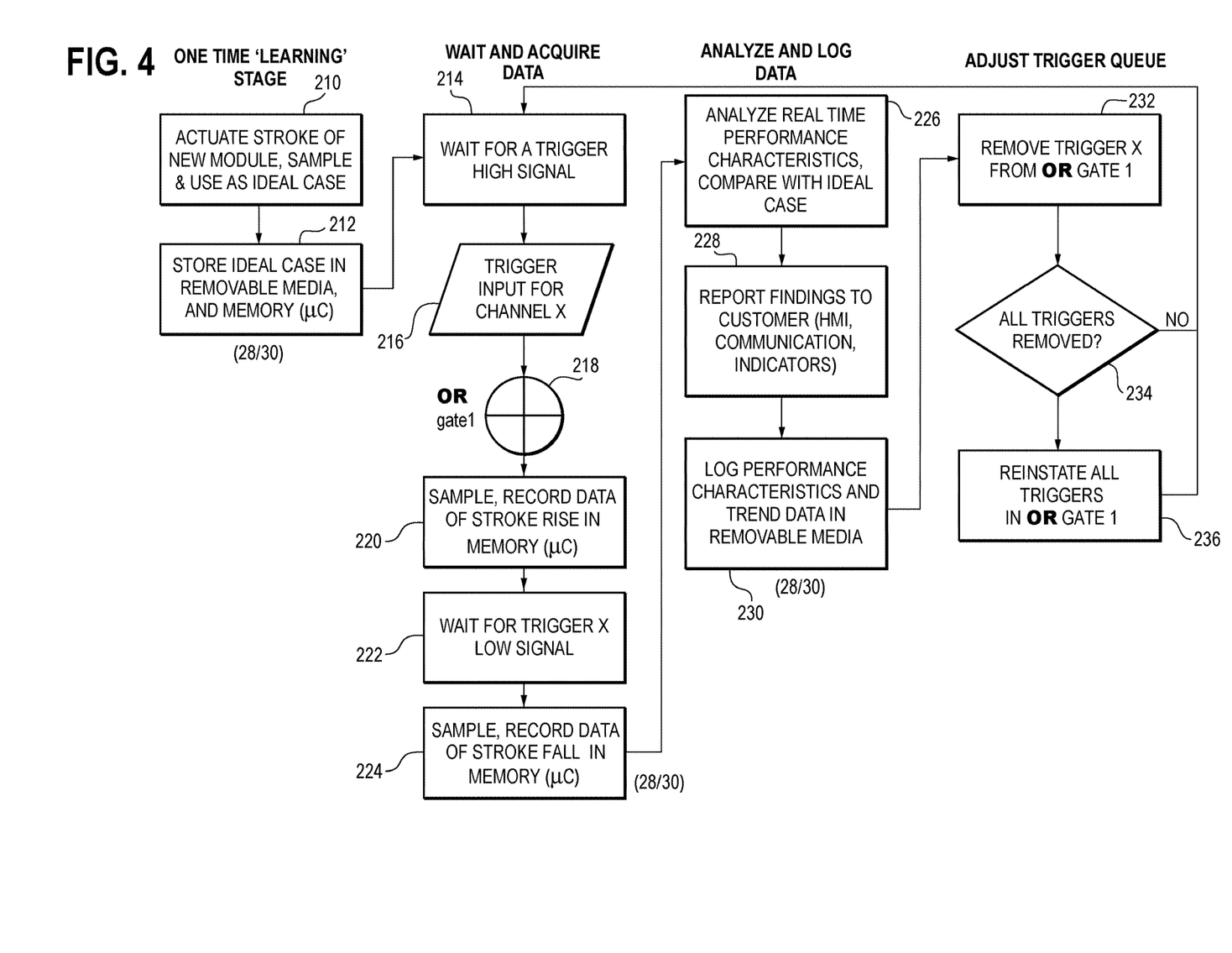
FIG. 4 is a process flow diagram for an embodiment of a monitoring and process scheme for multiple channels.

Advantageously, the present system can be used to monitor, record and analyze data from multiple valve modules. Referring to FIG. 4, the system 200 first determines baseline data or ideal operating conditions for each valve module. For purposes of the present multichannel discussion, reference will be made to four channels, channels A, B, C and D. It will, however, be appreciated that any number of channels can be monitored simultaneously with the understanding that the following description is modified for the particular number of channels monitored.

As step 210, the baseline data such as the full open and full closed positions of the valve module, and the calculated displacement of the valve module, such as the valve module of channel A, is collected and analyzed, and at step 212, the data is recorded. Baseline data is recorded, analyzed and logged for each channel A through D.

The system then waits for a trigger signal high, which is a signal to open the valve module at step. The trigger high signal is coincident to (or piggy backs from) the signal to the solenoid to route air top open the valve module. Upon receipt of the signal, at step 214, the system determines whether channel A is the first or next channel in the queue to be analyzed, that is whether the trigger is the correct channel trigger at step 216. If the correct channel trigger signal is received, the system moves through OR gate 218 and the recording of data commences at step 220, and as noted above, recording the time to open and the position of the valve member. The data is sampled and recorded or stored as at steps 112-118 in FIG. 3.

The system then awaits receipt of the trigger signal low for channel A, as at step 222, and, as noted above, data is recorded at step 222, including the time to close and the position of the valve member, which data is sampled and recorded or stored as at steps 122-128 in FIG. 3.

The data collected in steps 220-224, which represents real time performance characteristics of the valve module, is compared to the baseline data for channel A at step 226, and the results are reported to a user at step 228. The channel A performance characteristics are logged or recorded, and trend data developed and recorded or stored locally at the processor and/or remotely including on portable media, such as a portable storage drive, as step 230.

A signal is then generated to remove channel A from the OR gate 218 at step 232, adjusting the trigger queue, and the system determines whether all channel triggers (A through D) have been removed at step 234. If all channel triggers have not been removed, the system returns to step 214 to await the trigger high signals at step 214. Upon receipt of the trigger signals high from the channels, the system filters all but the remaining unsampled channels in the queue, which, following channel A is any of the unsampled channels, for example, channel B. The channel B signal then moves through the OR gate at step 218 and recording or logging and analysis of data for channel B continues through steps 220 to 232, at which time a signal is generated to remove channel B from the OR gate 218, adjusting the trigger queue, and the system then commences recording or logging and analyzing data from any of the remaining unsampled channels, for example, channel C.

After recording or logging and analyzing data from all of the remaining unsampled channels, at step 234 the system determines that all triggers have been removed, and at step 236 all triggers are reinstated at OR gate 218, the trigger queue is adjusted and the system commences recording or logging and analyzing data beginning again with any of the unsampled channels, for example channel A.

Figure 5:
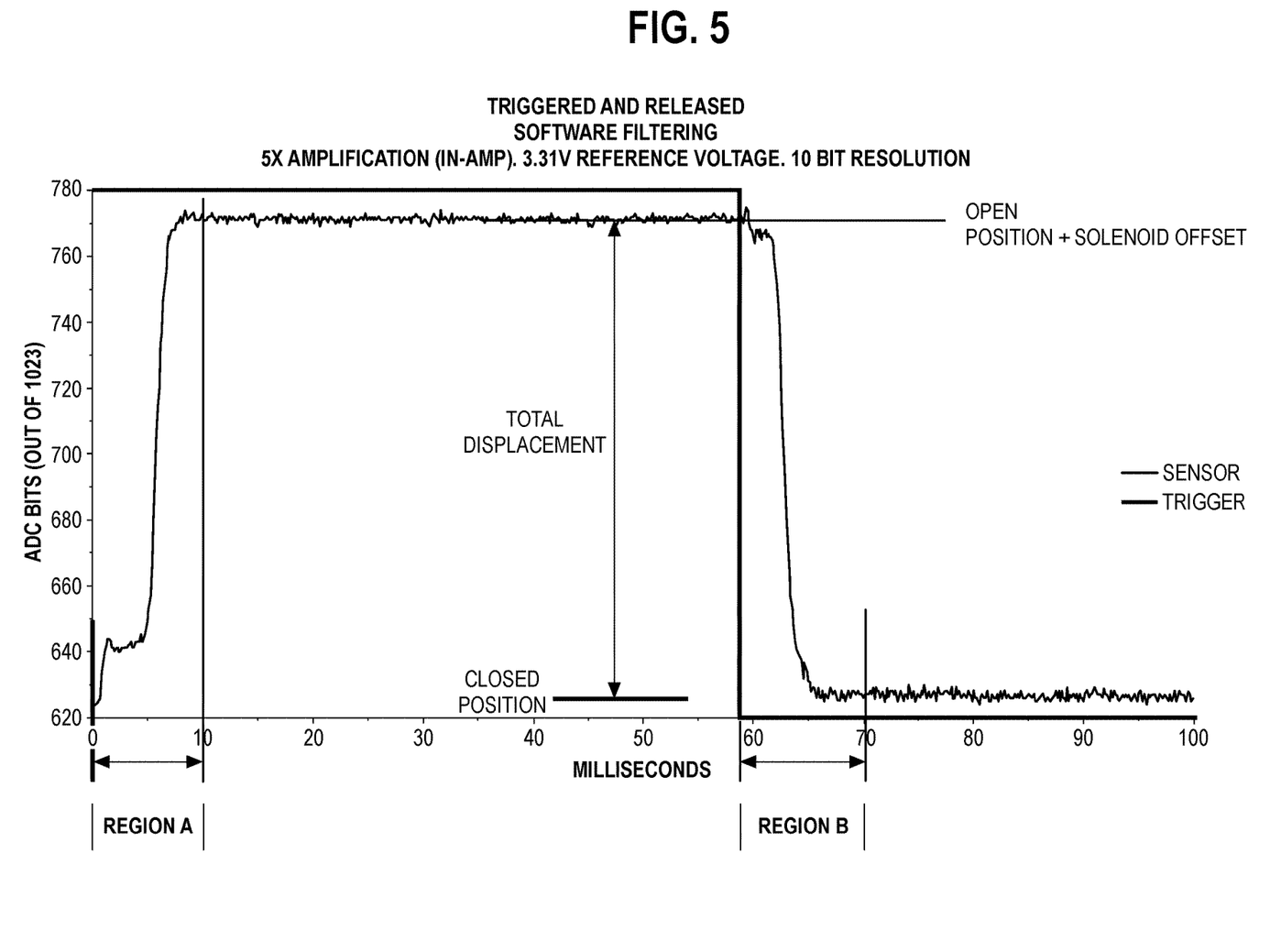
FIG. 5 is a plot showing valve travel versus response time for the valve module on trigger (to open) and release (to close) in which valve travel is shown in an analog to digital conversion (ADC) relative scale (out of a total value of 1023) along the vertical axis and time (in milliseconds) on the horizontal axis.
Figure 6:
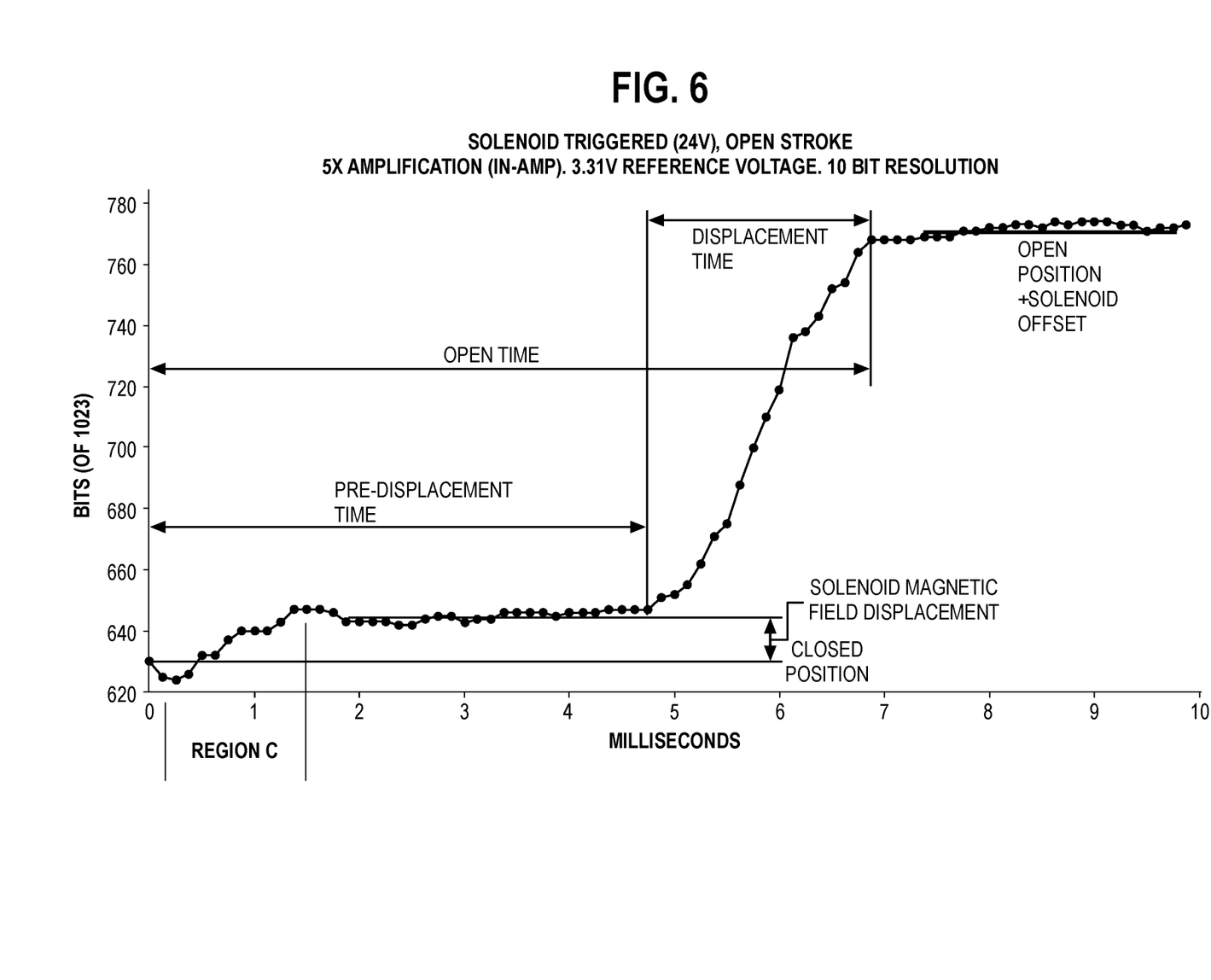
FIG. 6 is an enlarged plot of region A of FIG. 5, showing valve response in opening as valve travel versus response time for time zero to 10 milliseconds of travel.
Figure 7:
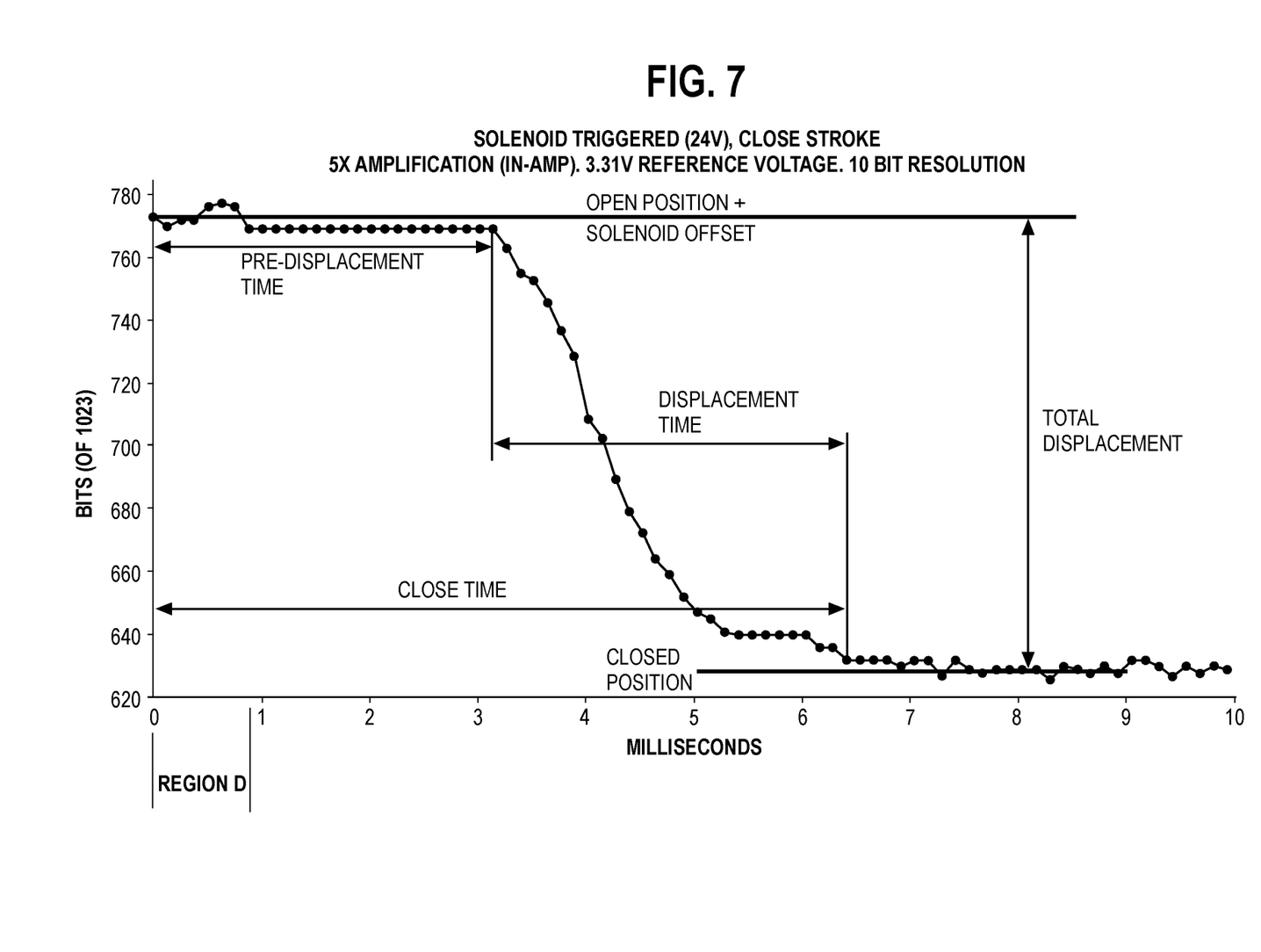
FIG. 7 is an enlarged plot of region B of FIG. 5, showing valve response in closing as valve travel versus response time for the final 10 milliseconds of travel.

FIGS. 5-7 are plots showing valve travel versus response time for the valve module. FIG. 5 shows the entire cycle from trigger to open and trigger release to close. Valve travel is shown in an analog to digital conversion (ADC) relative scale (out of a total value of 1023) along the vertical axis and time (in milliseconds) on the horizontal axis. FIG. 6 is an enlarged plot showing the response on trigger to open as indicated at region A in FIG. 5 and FIG. 7 is an enlarged plot showing the response on release or trigger to close as indicated at region B in FIG. 5.

Referring first to the trigger (to open) portion of FIGS. 5 and 6, it can be seen that there is first a lag from trigger, which corresponds to actuation or energizing of the solenoid until the valve begins to open, or a predisplacement time, of about 4.7 milliseconds and a displacement time or time to move the valve module from closed to open of about 2.1 to 2.2 milliseconds, with time to a full open of about 6.8 to 6.9 milliseconds from trigger.

As seen on the extreme left-hand side of the plot in FIG. 6, there is an upward sinusoidal-like portion of the plot (region C) that corresponds to a small magnetic field that is generated by the energized solenoid. This magnetic field is calculated (see the above discussion regarding determining the baseline or ideal operating conditions for a valve module) and corrected or filtered out in the measurement of the valve stroke. Likewise, the magnetic field signature is corrected or filtered out in the measurement of the valve full open position as the solenoid remains energized.

In the trigger closed stroke of the valve module, as seen in FIGS. 5 and 7, there is again a predisplacement time, which corresponds to de-actuation or deenergizing of the solenoid valve of about 3.1 milliseconds and a displacement time or time to move the valve module from open to closed of about 3.1 to 3.2 milliseconds, with a time to full closed of about 6.2 to 6.3 milliseconds from trigger or release.

As seen on the extreme left-hand side of the plot in FIG. 7, there is a sinusoidal-like portion of the plot (region D) that corresponds to the loss of the magnetic field generated by the energized solenoid (due to the deenergization of the solenoid). The loss of magnetic field is likewise taken into consideration in the determining the valve stroke.

A method for monitoring the performance of a valve module in an adhesive dispenser system having one or more modules includes measuring baseline data for the valve module. The method further includes waiting for a trigger signal high, which is a signal to open the valve module. Upon receiving the signal, recording data including but not limited to time to open the valve module and the position or stroke of the valve member, sampling the data and storing the data. If the system indicates a trigger signal high is maintained and a recording window limit is not reached, the method includes continuing data sampling and storing.

The method further includes, if a trigger signal high is not received, indicating that the signal to open has ceased (signaling closure of the valve module), or if the recording window limit has been reached, awaiting receipt of the trigger signal low, commencing recording of data, recording, including but not limited to time to close and position of the valve member, and sampling and storing the data. If the system indicates that a trigger signal low is maintained and a recording window limit has not been reached, the method includes continuing data sampling and storing.

The method further includes, if a trigger signal low is not received, indicating that the signal to close has ceased (signaling opening of the valve module), or if the recording window limit has been reached, analyzing the data and logging and storing the data locally, in storage local to a processor or remotely including on portable media, and then awaiting a trigger signal high.

A method of monitoring the performance of more than one valve module includes measuring baseline data for each of the valve modules, waiting for a trigger signal high, which is a signal to open a first valve module. Upon receiving the signal, recording data including but not limited to time to open the first valve module and the position or stroke of the first valve member, sampling the data and storing the data of the first valve module. If the system indicates a trigger signal high is maintained and a recording window limit is not reached for the first valve module, the method includes continuing data sampling and storing for the first valve module.

The method further includes, if a trigger signal high is not received, indicating that the signal to open has ceased (signaling closure of the valve module), or if the recording window limit has been reached, awaiting receipt of the trigger signal low for the first valve module, commencing recording of data for the first valve module, recording, including but not limited to time to close and position of the first valve module valve member, and sampling and storing the data for the first valve module. If the system indicates that a trigger signal low is maintained and a recording window limit has not been reached for the first valve module, the method includes continuing data sampling and storing.

The method further includes, if a trigger signal low is not received, indicating that the signal to close has ceased (signaling opening of the valve module), or if the recording window limit has been reached for the first valve module, analyzing the data and logging and storing the data locally, in storage local to a processor or remotely including on portable media, and then awaiting a trigger signal high.

Upon receipt of a trigger signal high, the method includes determining whether the signal is generated from a next valve module in a valve module queue and if the signal is from the next valve module in the valve module queue commencing recording data as noted above. The method further includes recording data for all of the valve modules in the valve module queue in a similar manner. When the system determines that data has been recorded for all of the valves modules in the valve module queue, the system resets the queue to await a trigger high signal from the first valve module in the valve module queue.

The present valve module stroke detection system and method provides a number of advantages over know detection systems. For example, the present system uses, in some embodiments, magnetic field sensors, such as Hall effect sensor to provide precise data and in many cases at a lower cost than other types of sensors, such as optical sensors, time of flight sensors, eddy current sensors, capacitive sensors and the like. It will, however, be appreciated that such other sensors may fall within the scope and spirit of the present disclosure.

The ability to monitor, log, store and analyze real time performance characteristics and data, including for example, module open or closed indication, timing, displacement and the like provides for troubleshooting the adhesive dispenser systems in real time. In addition, the performance characteristics and trend data can be logged in a removable media platform for local or remote troubleshooting and analysis. In addition, the use of trend data can be used to establish the "health" of the module, can be used to establish preventative maintenance programs and predictive lifetime analyses. Further, the present system can be configured to monitor several modules with a single processor by utilizing a queue to read and store sensor data.

All patents referred to herein, are hereby incorporated herein in their entirety, by reference, whether or not specifically indicated as such within the text of this disclosure.

In the present disclosure, the words "a" or "an" are to be taken to include both the singular and the plural. Conversely, any reference to plural items shall, where appropriate, include the singular.

It will also be appreciated by those skilled in the art that the relative directional terms such as sides, upper, lower, rearward, forward and the like are for explanatory purposes only and are not intended to limit the scope of the disclosure.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

The invention claimed is:

1. A valve module stroke detection system, comprising:
a plurality of adhesive valve modules, each having a reciprocating valve pin, the pin reciprocating in a first direction by application of a compressed gas on one side of a piston and reciprocating in a second opposite direction by application of the compressed gas on an opposite side of the piston, the reciprocating pin having a portion in an adhesive flow path;
a sensed element on each valve pin, the sensed element disposed outside of the adhesive flow path;
a sensor associated with each sensed element positioned outside of the adhesive flow path, the sensor configured to cooperate with its respective sensed element and generate a movement signal upon sensing a movement of the valve pin and to generate a timing signal upon of the movement of the valve pin, the sensor and sensed element being longitudinally aligned with one another, the sensor being located on and at an axial end of the valve pin;
a processor to process the movement signal and the timing signal; and
a recording medium to record the movement signal and the timing signal,
wherein the sensed element is a magnet and the sensor is a Hall effect type sensor, the magnet having a ring shape or a disk shape,
wherein the movement signal is a continuous analog signal corresponding to the position of the sensed element,
wherein the processor is configured to determine a baseline conditions for the valve module,
wherein the processor is configured to compare the movement signal and the timing signal to the baseline conditions for the valve module to establish a comparative movement value and a comparative timing value, and
wherein the comparative movement and timing signals and the comparative movement and timing values of each sensor are used to develop trend data, the trend data being stored in a medium, and
wherein the movement signal and timing signals and the comparative movement and timing values are determined for each valve module sequentially.

2. The system of claim 1 further including an indicator and wherein the indicator is local to the adhesive valve module.

3. The system of claim 1 further including an indicator and wherein the indicator is remote from the adhesive valve module.

4. A method for continuously monitoring the performance of each valve module in an adhesive dispenser system having more than one valve module, including the steps of:
measuring a baseline data for each of the valve modules, the baseline data for each valve module being measured by a full stroke of valve pins in each of the valve modules to assign labels to a full open position and a full closed position of the valve modules, and calculating a displacement of the valve pin;
monitoring the performance of each valve module by:
upon receipt of a trigger signal high to open the valve module, recording a time to open the valve module and a position of the valve module;
storing the recorded time to open data and the position data;
if the trigger signal high is maintained and a recording window limit is not reached, continuing recording data;
if the trigger signal high is not received or if the recording window limit has been reached, awaiting receipt of a trigger signal low;
upon receipt of a trigger signal low, recording a time to close the valve module the position of the valve module;
storing the recorded time to close data and the position data;
if the trigger signal low is maintained and a recording window limit has not been reached, continuing recording data;
if the trigger signal low is not received or if the recording window limit has been reached, analyzing the data, and logging and storing the data;
awaiting a second trigger signal high;
establishing a queue and wherein the step of awaiting a second trigger high signal is awaiting a trigger high signal from a second valve module in the queue; and
resetting the queue following monitoring the performance of all of the valve modules in the queue,
wherein the valve module includes a valve pin and wherein a position of the valve pin is generated by a sensed element on the valve pin and a sensor longitudinally aligned with and spaced from one another, the sensor being located on and at an axial end of the valve pin, and the sensed element being a magnet and having a ring shape or a disk shape.

5. The method of claim 4 including at least four valve modules.

* * * * *